(12) United States Patent
Ho et al.

(10) Patent No.: US 9,407,507 B2
(45) Date of Patent: Aug. 2, 2016

(54) TOPOLOGY DISCOVERY IN A HYBRID NETWORK

(75) Inventors: Saiyiu Duncan Ho, San Diego, CA (US); Bibhu Prasad Mohanty, San Diego, CA (US); Etan Gur Cohen, San Francisco, CA (US); Rahul Malik, Bangalore (IN); Randall Coleman Gellens, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 13/599,715

(22) Filed: Aug. 30, 2012

(65) Prior Publication Data

US 2013/0250810 A1 Sep. 26, 2013

Related U.S. Application Data

(60) Provisional application No. 61/529,224, filed on Aug. 30, 2011.

(51) Int. Cl.
*H04L 12/24* (2006.01)
*H04L 12/751* (2013.01)
(Continued)

(52) U.S. Cl.
CPC ............... *H04L 41/12* (2013.01); *H04L 45/02* (2013.01)

(58) Field of Classification Search
CPC ......... H04L 41/12; H04L 45/02; H04L 45/26; H04L 12/2803; H04L 12/66
USPC ............... 370/255–258; 709/223–226
See application file for complete search history.

(56) References Cited

U.S. PATENT DOCUMENTS 6,012,084 A 1/2000 Fielding et al.
7,085,814 B1 * 8/2006 Gandhi et al. ............... 709/208
(Continued)

FOREIGN PATENT DOCUMENTS

CN 1866863 11/2006
CN 101155084 4/2008
(Continued)

OTHER PUBLICATIONS

"PCT Application No. PCT/2012/053222 Written Opinion of the IPEA", Aug. 8, 2013, 8 pages.
(Continued)

*Primary Examiner* — Un C Cho
*Assistant Examiner* — Peian Lou
(74) *Attorney, Agent, or Firm* — DeLizio Law, PLLC

(57) ABSTRACT

Systems and methods provide a discovery protocol allowing nodes that are interested in knowing a network topology to discover other nodes in the network topology. The discovery protocol includes two message types, topology discovery messages and topology query messages. A node issues topology discovery messages upon powering up, at periodic intervals, or upon detecting a change in network topology. The topology discovery messages are broadcast to all nodes on a network and identify the issuing node to the network. A topology query message is sent to a particular node and requests a response from the receiving node regarding the neighboring nodes of the receiving node. The querying node can use the response data to discover other nodes and to send the discovered nodes query messages such that the node can determine a network topology to a desired level of depth within the network.

24 Claims, 5 Drawing Sheets

(51) Int. Cl.
*H04L 12/66* (2006.01)
*H04L 12/28* (2006.01)
*H04L 12/46* (2006.01)
*H04L 12/721* (2013.01)
*H04L 29/12* (2006.01)
*H04W 8/04* (2009.01)
*H04W 8/06* (2009.01)
*H04W 40/24* (2009.01)

(56) References Cited

U.S. PATENT DOCUMENTS

| | | | |
|---|---|---|---|
| 7,366,113 | B1 | 4/2008 | Chandra et al. |
| 7,706,340 | B2 | 4/2010 | Bronez |
| 7,843,921 | B2 | 11/2010 | Muhonen et al. |
| 7,961,674 | B2 | 6/2011 | Jing et al. |
| 8,099,764 | B2 | 1/2012 | Herzog et al. |
| 8,260,902 | B1* | 9/2012 | DeGraaf et al. ............... 709/223 |
| 8,549,541 | B2* | 10/2013 | Moyer ............... H04L 12/2803 709/221 |
| 2002/0152299 | A1* | 10/2002 | Traversat et al. ............. 709/223 |
| 2004/0010617 | A1 | 1/2004 | Akahane et al. |
| 2004/0022226 | A1 | 2/2004 | Edlund et al. |
| 2006/0168159 | A1* | 7/2006 | Weisman ............... G06F 9/4411 709/220 |
| 2006/0230238 | A1 | 10/2006 | Roy et al. |
| 2007/0089055 | A1 | 4/2007 | Ko et al. |
| 2007/0201459 | A1 | 8/2007 | Bao et al. |
| 2007/0208837 | A1 | 9/2007 | Tian et al. |
| 2008/0276004 | A1* | 11/2008 | Thomson et al. ............. 709/244 |
| 2009/0116404 | A1 | 5/2009 | Mahop et al. |
| 2009/0225758 | A1 | 9/2009 | Morimoto et al. |
| 2010/0165884 | A1 | 7/2010 | Farkas et al. |
| 2010/0188971 | A1 | 7/2010 | Chiang |
| 2010/0232317 | A1* | 9/2010 | Jing et al. ....................... 370/254 |
| 2011/0099559 | A1* | 4/2011 | Kache et al. ................... 719/318 |
| 2011/0134797 | A1* | 6/2011 | Banks et al. ................... 370/254 |
| 2011/0206035 | A1 | 8/2011 | Lee et al. |
| 2012/0084413 | A1 | 4/2012 | Pasternak |
| 2012/0099457 | A1 | 4/2012 | Roy |
| 2012/0158933 | A1 | 6/2012 | Shetty et al. |
| 2012/0176914 | A1* | 7/2012 | Choudhury et al. .......... 370/248 |
| 2012/0203897 | A1 | 8/2012 | Mishra et al. |
| 2012/0236757 | A1* | 9/2012 | Klein ..................... H04L 41/12 370/255 |
| 2012/0320893 | A1* | 12/2012 | Jamadagni .......... H04L 12/2818 370/338 |
| 2012/0320919 | A1 | 12/2012 | Baliga et al. |
| 2013/0067056 | A1 | 3/2013 | Purkayastha et al. |

FOREIGN PATENT DOCUMENTS

| | | |
|---|---|---|
| CN | 101228744 | 7/2008 |
| EP | 2756709 | 10/2015 |
| JP | 2003209577 | 7/2003 |
| JP | 2004512622 | 4/2004 |
| JP | 2004266519 | 9/2004 |
| JP | 2007226805 | 9/2007 |
| JP | 2008046757 | 2/2008 |
| JP | 2008078935 | 4/2008 |
| JP | 2009512401 | 3/2009 |
| JP | 2009217836 | 9/2009 |
| KR | 20100006409 | 1/2010 |
| WO | 0158069 | 8/2001 |
| WO | 0235796 | 5/2002 |
| WO | 2006138122 A2 | 12/2006 |
| WO | 2007114183 | 10/2007 |
| WO | 2008026256 | 3/2008 |
| WO | 2011102688 | 8/2011 |
| WO | 2013033457 | 3/2013 |
| WO | 2013040097 | 3/2013 |

OTHER PUBLICATIONS

"PCT Application No. PCT/US2012/054948 International Preliminary Report on Patentability", Sep. 17, 2013, 7 pages.
PCT Application No. PCT/US12/54948 International Search Report, Feb. 8, 2013, 11 pages.
Co-pending U.S. Appl. No. 13/599,715, filed Aug. 30, 2012, 44 pages.
IEEE P1905.1, "Standard for a Convergent Digital Home Network for Heterogeneous Technologies", Project Authorization Request (PAR), Available from IEEE, Authorizes a Standards Development Project to Define an "Abstraction layer" that Provides a Single Common Interface to Upper Layers for Devices that Implement Multiple Networking Interfaces, Nov. 8, 2010.
PCT Application No. PCT/US12/53222 International Search Report, Jan. 16, 2013, 14 pages.
Ahn, Sanghyun et al., "Energy-Efficient Flooding Mechanisms for the Wireless Sensor Networks", Information Networking, 2008. ICOIN 2008, IEEE Jan. 23, 2008, 5 pages.
"PCT Application No. PCT/US2012/053222 International Preliminary Report on Patentability", Oct. 29, 2013, 10 pages.
"U.S. Appl. No. 13/610,846 Office Action", Jun. 30, 2014, 22 pages.
"U.S. Appl. No. 13/610,846 Final Office Action", Oct. 29, 2014, 28 pages.
"Korean Patent Application No. 1020147009723, KIPO Notice of Grounds for Rejection", Nov. 21, 2014, 10 pages.
"Korean Patent Application No. 1020147008396, KIPO Notice of Grounds for Rejection", Oct. 27, 2014, 10 pages.
"Japanese Patent Application No. 2014528615 Office Action", Mar. 16, 2015, 9 pages.
"Japanese Patent Application No. 2014529995, Office Action", Jul. 28, 2015, 10 pages.
"Japanese Patent Application No. EP15182899.3, European Search Report", Nov. 30, 2015, 7 pages.
"Korean Patent Application No. 1020147009723, KIPO Notice of Grounds for Rejection", Jul. 29, 2015, 9 pages.
"U.S. Appl. No. 13/610,846 Final Office Action", Oct. 23, 2015, 27 pages.
"U.S. Appl. No. 13/610,846 Office Action", May 7, 2015, 27 pages.
Aoki, "Performance Evaluation of Multiplexing Schemes for IP Packets in Digital Multimedia Broadcasting Systems", Nov. 15, 2010, 15 pages.
Yasuda, "Development of Terminal Information Gathering Mechanism for Ad Hoc Network Testbed", Feb. 28, 2008, 8 pages.
"European Patent Office Application No. 15186905.4, European Search Report", Dec. 7, 2015, 9 pages.

* cited by examiner

TOPOLOGY DISCOVERY IN A HYBRID NETWORK

RELATED APPLICATIONS

This application claims the priority benefit of U.S. Provisional Application Ser. No. 61/529,224 filed Aug. 30, 2011.

BACKGROUND

Embodiments of the inventive subject matter generally relate to the field of communication systems and, more particularly, to a mechanism for discovery of devices in a hybrid communications network.

Hybrid communications networks typically comprise multiple networking technologies (e.g., wireless local area network (WLAN) technologies, powerline communication technologies, Ethernet technologies, etc.) that are interconnected using bridging-capable devices that forward packets between devices utilizing the different network technologies and media in order to form a single extended communication network. A convergent communications network may also be referred to as a hybrid communications network. Typically, the communication mechanisms, and protocol specifics (e.g., device and topology discovery, bridging to other networks, etc.) are unique to each networking technology. The convergent communications network can comprise hybrid communication devices and conventional (or legacy) communication devices.

SUMMARY

Various embodiments provide a discovery protocol allowing nodes that are interested in knowing a network topology to discover other nodes in the network. The discovery protocol may include topology discovery messages and topology query messages. A node may issue topology discovery messages upon powering up, at periodic intervals, or upon detecting a change in network topology. The topology discovery messages may be broadcast to all nodes or a subset of nodes on a network and may identify the issuing node to the network. In some embodiments, more than one type of topology discovery messages may be issued substantially simultaneously, for example, a first type of topology discovery messages for P1905.1 compliant devices and a second type of legacy discovery messages for IEEE 802.1D compliant devices.

Nodes on the network that are interested in acquiring further details on the network topology can issue topology query messages. A topology query message may be sent to a particular node (known through the topology discovery messages) to request a response from the receiving node regarding the neighboring nodes of the receiving node. In some embodiments, the topology query may be a onetime request and the receiving node may provide a single response. In alternative embodiments, the topology query may be a subscription request and the receiving node may provide a response when the receiving node detects a change in the network topology. In either case, the querying node can use the response data to discover other nodes and to send the discovered nodes topology query messages such that the querying node can determine a network topology to a desired level of depth.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
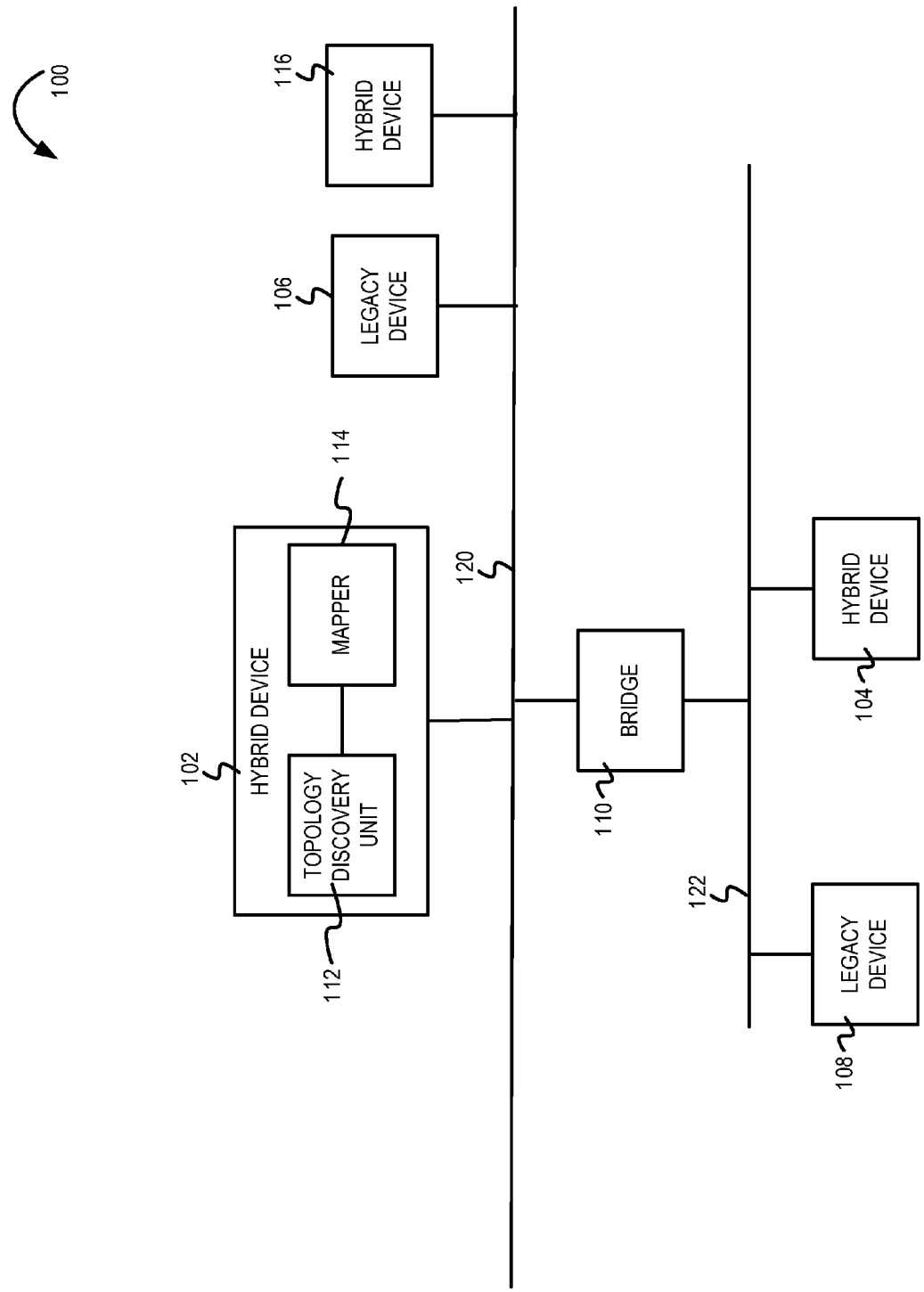
FIG. 1 is an example block diagram illustrating a system for determining a topology in a hybrid network.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in manner that is capable of performing the task(s) at issue.

The terms "first", "second" etc. are used as labels for nouns that they precede, and do not imply any type of ordering (e.g., spatial, temporal, logical, etc.). For example, in a P1905.1 compliant network, the terms "first" and "second" messages can be used to refer to any two messages. In other words, the "first" and "second" messages are not limited to logical occurrences 0 and 1.

The term "based on" is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The description that follows includes example systems, methods, techniques, instruction sequences, and computer program products that embody techniques of the present inventive subject matter. However, it is understood that the described embodiments may be practiced without these specific details. For instance, although in some embodiments the topology discovery mechanism can be implemented for hybrid communications networks comprising wireless local area network (WLAN) devices (e.g., IEEE 802.11n devices), powerline network devices (e.g., HomePlug AV devices) and Ethernet devices, in other embodiments the topology discovery mechanism can be implemented in hybrid communications networks that may comprise other suitable types of network devices that implement other standards/protocols (e.g., WiMAX, etc.). In other instances, well-known instruction instances, protocols, structures, and techniques have not been shown in detail in order not to obfuscate the description.

A hybrid communication network is typically formed by interconnecting communication networks (that support different communication protocols) across different network technologies and communication media. A Convergent Digital Home Network (CDHN) is one example of such a hybrid network, although many other types of hybrid networks exist. The hybrid communications network can comprise multi-interface communication devices ("hybrid devices") that are configured to operate across multiple networking technologies as well as conventional, single-interface communication devices ("legacy devices"). It is desirable for the hybrid devices and legacy devices to implement topology discovery and other information exchange protocols to advertise their presence to other devices in the hybrid communications network. For proper packet routing and to enable power saving and other optimizations, the devices on the network should be aware of the topology of the hybrid communications network. Existing topology discovery techniques may rely on manual configuration of network parameters, or explicit provision of topology information that can be too complicated for users.

Various embodiments are disclosed for topology discovery and message structures in a hybrid communication network (e.g., a CDHN). Although the following disclosure is described in terms of P1905.1 compliant networks and devices for ease of understanding, the disclosed embodiments may be applied to other types of networks and technologies. A hybrid communications network may allow for the utilization and interfacing of heterogeneous networking technologies. Example heterogeneous networking technologies may include powerline networks (IEEE P1901), WiFi (IEEE 802.11), Ethernet (IEEE 802.3) and MoCA 1.1, among others. Hybrid devices may be capable of dynamic interface selection for transmission of packets arriving from any interface (e.g., upper protocol layers or underlying network technologies). End-to-end Quality of Service (QOS) may also be supported. In some embodiments, the hybrid communications network may interface with another network (e.g., a LAN provided by a service provider). The topology discovery mechanisms described herein may allow devices to determine the topology for connectivity of the whole network (or a subset of the network). In addition, the message structures described herein may allow for handling of fragmentation and provide general information (e.g., source interface address, destination interface address, etc.) of the message. Such message structures may be used in topology discovery, security, and network configuration, among other types of protocols.

In particular embodiments, the disclosed topology discovery protocol may enable devices (e.g., P1905.1 compliant devices) to discover other devices (e.g., P1905.1 compliant devices, legacy devices, etc.) in a hybrid network such as a CDHN. The topology discovery protocol may also enable devices to populate a topology database. For instance, the topology database may be a P1905.1 topology database. The topology discovery protocol may also enable updating of the topology database in the event of a change in network topology.

In various embodiments, the topology discovery protocol may enable devices to determine which devices are reachable by it, and by extension, a device (e.g., a mapper of the device) may infer a more complete network topology. The protocol may also enable the devices to be notified by other devices of any changes in network topology.

FIG. 1 is a block diagram illustrating an example system for determining a network topology in a hybrid communications network 100. As described above, the hybrid communications network 100 can comprise communication devices (e.g., hybrid devices, bridges, legacy devices, etc.) that implement one or more communication protocols (e.g., WLAN, HomePlug AV, Ethernet, etc.), based on various networking standards and operating either wirelessly or over various wired media (powerline, coax cable, unshielded twisted pair telephone cable, CAT5 shielded twisted pair cable, etc.). In some implementations, the hybrid devices can be electronic devices that comprise bridging capabilities across multiple types of network interfaces in addition to communication capabilities over multiple types of network interfaces. Such hybrid devices may be referred to as "hybrid bridges." The hybrid devices can also be electronic devices that comprise communication capabilities over multiple types of network interfaces but do not comprise bridging capabilities. Such hybrid devices may be referred to as "hybrid communication devices." In some implementations, the legacy devices can be electronic devices that comprise bridging capabilities in addition to communication capabilities, which can be referred to herein as "legacy bridges." The legacy devices can also be electronic devices that comprise communication capabilities but do not comprise bridging capabilities. Such legacy devices may be referred to as "legacy communication devices." In FIG. 1, example hybrid communications network 100 comprises two network segments 120 and 122. The network segment 120 comprises hybrid devices 102 and 116, and a legacy device 106. The network segment 122 comprises a hybrid device 104 and a legacy device 108. A bridge 110 couples the network segment 120 and the network segment 122. The bridge 110 may be either a hybrid bridge or a legacy bridge. The hybrid device 102 includes a topology discovery unit 112 and a mapper unit 114. Likewise, although not depicted in FIG. 1, the hybrid devices 104 and 116 can also optionally include their own respective device topology discovery units and mapper units. In some embodiments, the hybrid devices 102, 104, and/or 116 can be hybrid bridges or hybrid communication devices. Likewise, the legacy devices 106 and 108 can be legacy bridges or legacy communication devices.

In some implementations, the hybrid devices 102, 104, and 116 can include multiple communication interfaces, each of which couples the hybrid device to different types of communication networks. For example, the hybrid device 102 can include three communication interfaces (e.g., a powerline interface, an Ethernet interface, and a wireless local area network (WLAN) interface) that enable the hybrid device 102 to connect to a powerline communication network, an Ethernet, and a WLAN, respectively. It is noted that even though FIG. 1 does not explicitly show multiple communication interfaces for the hybrid devices 102, 104 and 116, the hybrid devices 102, 104 and 116 can comprise two or more communication interfaces that couple the hybrid devices to two or more communication networks. The legacy devices typically comprise only one communication interface for communication via the corresponding communication network. For example, the legacy devices 106 and 108 may comprise an Ethernet interface for communication via Ethernet.

In some implementations described herein, a two stage topology discovery protocol may be used. The two stage topology discovery protocol may include a first stage where devices announce their presence by issuing topology discovery messages to other nodes in the hybrid communications network 100, and a second stage where devices interested in determining a network topology issue topology query messages to selected nodes in the hybrid communications network 100. A mapper unit 114 may use the information obtained in responses to the topology query messages to build a topology map in a topology database. Thus during the first stage, some or all of hybrid devices 102, 104, and 116 can broadcast topology discovery messages to advertise their presence in the hybrid communications network 100. For example, hybrid device 116 can broadcast a topology discovery message including an identifier of the hybrid device 116 to announce its presence in the hybrid communications network 100 to the hybrid devices 102 and 104.

In some embodiments, hybrid communications network 100 includes P1905.1 compliant devices. In such embodiments, the two stage topology discovery protocol may include a Multicast Discovery Mechanism that is used during the first stage and a Unicast Topology Discovery Mechanism that is used during the second stage. The Unicast Topology Discovery Mechanism may include a Topology Query/Response Procedure and/or a Topology Subscription/Notification Procedure, as described herein. During the second stage of the topology discovery protocol, the Unicast Topology Discovery Mechanism may enable a P1905.1 mapper (e.g., mapper unit 114 of hybrid device 102) to obtain another P1905.1 compliant device's neighbor information. For example, a P1905.1 mapper may construct a more complete network map by sending a topology query or topology subscription request messages to each of its neighboring P1905.1 compliant devices to obtain topology information regarding the neighboring device's neighbors (via topology response or topology notification messages). The Topology Query/Response Procedure may enable a device to obtain information about another device as well as another device's neighbors. Also, in some implementations, the device may implement the Topology Subscription/Notification Procedure that may enable a device to subscribe to receive notification of any changes in topology at another device. Upon detection of a change in topology, a message (e.g., a topology notification message) may be sent to a subscriber device.

In one embodiment, during the first stage of the topology discovery protocol, a device may send multiple types of multicast messages on each of its interfaces. For example, a P1905.1 compliant device may send a legacy discovery message and a topology discovery message on each of its interfaces. In some embodiments, the legacy discovery message may be used to add information about legacy devices that are reachable in the hybrid network and that may not have implemented the P1905.1 protocol. In addition, the legacy discovery message may, in combination with a topology discovery message, be used to determine a type of bridge between a P1905.1 device and other devices on the hybrid communications network based at least in part on whether or not the bridge forwards either the legacy discovery message or the topology discovery message, as further described below. The legacy discovery message in some embodiments is an LLDP (Link Layer Discovery Protocol) compliant discovery message that may be sent to the LLDP nearest bridge multicast address. The topology discovery message may be sent to a predetermined multicast address such as the P1905.1 Multicast Address. The legacy discovery message and the topology discovery message may be forwarded in different manners by different types of devices. For example, a legacy discovery message may be forwarded by P1905.1 compliant bridges and IEEE 802.1-D compliant legacy bridges. The topology discovery message may be forwarded by IEEE 802.1-D compliant legacy bridges, but in some cases, not by P1905.1 compliant bridges.

A P1905.1 compliant device (e.g., a mapper unit 114 of the hybrid device 102) may construct a more complete network map by sending a topology query message or topology subscription request message to a neighboring P1905.1 compliant device to obtain topology information regarding the neighboring device's neighbors (e.g., via a topology response message or a topology notification message sent by the neighboring device in response to the topology query message or topology subscription request message). The P1905.1 compliant device may send the topology query messages or the topology subscription request messages to some or all of the neighboring device's P1905.1 compliant neighbors, and so forth in order to obtain network topology information to a desired depth. It is noted that, in some implementations, a first device does not have to be physically adjacent to a second device in order to be considered a "neighbor" device. Instead, the first device may only be "communicatively located adjacent" to at least one interface of the second device in order for the first device and second device to be neighbors. In particular embodiments, a device is a "neighbor" if the device is reachable without being bridged by another P1905.1 compliant device. Some devices may be reachable but not neighbors, for example, a P1905.1 compliant or legacy device bridged by another P1905.1 compliant device.

In some embodiments, the Multicast Discovery Procedure, Topology Query/Response Procedure, and the Topology Subscription/Notification Procedure may enable P1905.1 compliant devices to discover, build, and/or maintain network topology information. The various mechanisms or procedures may utilize one or more of the following messages: topology discovery message (multicast), legacy discovery message (multicast), topology query message (unicast), topology response message (unicast), topology subscription request message (unicast), and topology notification message (unicast). Further details on the messages listed above and the use of the messages by devices and topology discovery units 112 within hybrid devices in hybrid communications network 100 are provided below with respect to FIGS. 2-4.

Figure 2:
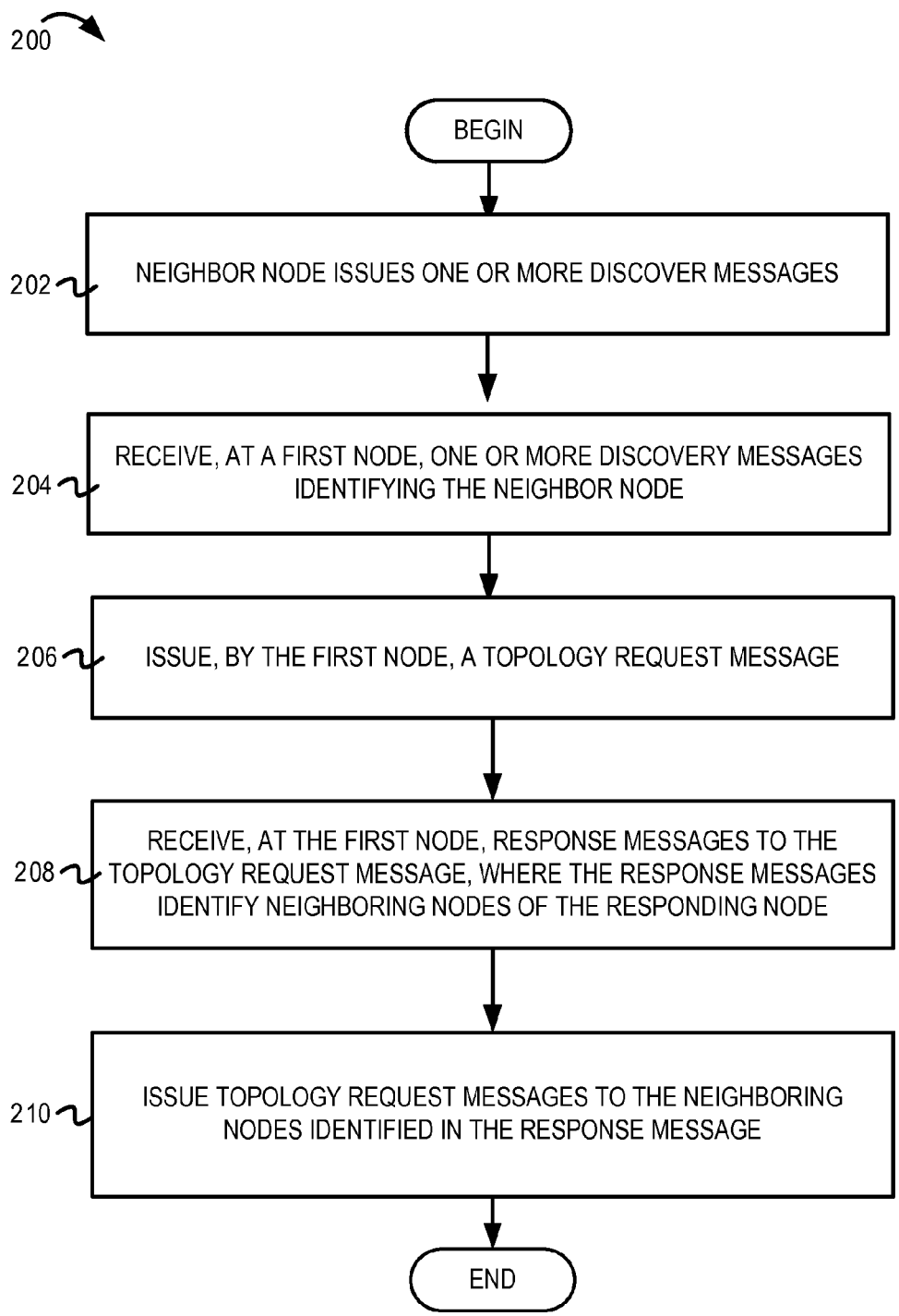
FIG. 2 is a flow diagram illustrating example operations for determining a topology in a hybrid network.

FIG. 2 is a flow diagram illustrating example operations in a method 200 for determining a topology in a hybrid communications network. Method 200 begins at block 202 when a device in a hybrid communications network (e.g., a CDHN) issues one or more topology discovery messages. The messages may include one or more message TLV (type, length, value) portions. In one embodiment, a P1905.1 compliant device may transmit the topology discovery message on all its interfaces, addressed to a P1905.1 Multicast Address. Transmission may occur for a variety of reasons. For instance, a topology discovery message may be sent when power is applied to the P1905.1 compliant device. Further, the topology discover message may be sent periodically, e.g., the topology discover message may be sent a certain amount of time (e.g., 60 seconds) after the last topology discovery message was sent. As another example, a topology discovery message may be sent when the transmitting device detects a change in topology. The topology change may be indicated by a change in any of the information received in a topology query response message. The topology change may also be determined by a transmitting device in response to detecting a neighboring device of the transmitting device can no longer communicate with the transmitting device. As a fourth example, a topology discovery message may be sent by a P1905.1 compliant device when a new device's topology discovery message is received by the P1905.1 compliant device. In some embodiments, a P1905.1 compliant device receiving additional topology discovery messages from new devices may defer sending its own additional topology discovery messages until a time period (e.g., 60 seconds) has elapsed since the last topology discovery messages was sent by the P1905.1 compliant device. Those of skill in the art having the benefit of the disclosure will appreciate that other implementation-dependent occasions may also trigger a topology discovery message to be sent. The topology discovery message may include a session ID, which, in some embodiments, may be generated upon device initialization (e.g., power up or reset) and may be unique over a period of time. A session identifier type TLV may be included with a topology discovery message. An example session identifier type TLV is shown in Table 1.

TABLE 1

| Field | Length | Value | Description |
| --- | --- | --- | --- |
| TLV type | 1 octet | 1 | Session Identifier Type |
| TLV Length | 1 octet | 4 | # octets in ensuing field |
| TLV Value | 4 octets | | Session identifier |

In one embodiment, a P1905.1 compliant device may transmit a legacy discovery message on all its interfaces, whenever a topology discovery message is sent. In other words, a P1905.1 compliant device may send both a topology discovery message and a legacy discovery message on all of the P1905.1 compliant device's interfaces. The legacy discovery message may include LLDP packets sent to the LLDP multicast address (using the LLDP Ethertype). The legacy discovery message may contain the sending device's P1905.1 device ID. An example Ethernet frame header information on which a legacy discovery message may be carried is described in Table 2.

TABLE 2

| Field | Length | Description |
| --- | --- | --- |
| SA | 6 octets | Interface specific MAC ID of the interface of the P1905.1 compliant device from which a P1905.1 Topology Discovery Message is Transmitted |
| DA | 6 octets | 01-80-C2-00-00-0E Nearest bridge group MAC address |
| Ethertype | 2 octets | 88-CC LLDP Ethertype |
| Payload | 46-1500 octets | LLDPDU |

In one embodiment, the following LLDP TLVs may be used to form a LLDPDU (Link Layer Discovery Protocol Data Unit): a chassis ID TLV, a port ID TLV, a time to live TLV, and an end of LLDPDU TLV. The chassis ID TLV may include a chassis ID subtype, which may be set to 4-MAC address. The chassis ID may be set to the P1905.1 MAC address. The port ID TLV may include a port ID subtype, which may be set to 3 (MAC address (IEEE 802)). The port ID may be set to the MAC ID of the interface on which the message is transmitted. The time to live TLV may include a time to live (TTL) value (e.g., 180 seconds).

In one embodiment, a P1905.1 message container may be used to carry TLVs from a transmitting device to one or more receiving devices. For example, the TLV may be transmitted to one receiving device if the destination address is a unicast address and to more than one receiving device if the destination address is a multicast address. If the message is too large to fit within an Ethernet frame, multiple fragments may be created at the TLV boundaries to form multiple messages. Table 3 includes an example of an Ethernet frame header on which the message is carried:

TABLE 3

| Field | Length | Description |
| --- | --- | --- |
| SA | 6 octets | Interface specific MAC ID of the P1905.1 compliant device from which a P1905.1 compliant Packet is Transmitted |
| DA | 6 octets | Interface specific MAC ID of the Recipient P1905.1 compliant device for unicast messages or New P1905.1 Multicast MAC address for multicast messages |
| Ethertype | 2 octets | P1905.1 Ethertype |
| Payload | 46-1500 octets | P1905.1 Message Body (see Table 4 below) |

Table 4 includes an example P1905.1 message container format.

TABLE 4

| | | | |
| --- | --- | --- | --- |
| TA | 6 octets | | P1905.1 MAC ID of transmitting device |
| RA | 6 octets | | For unicast message, this is the P1905.1 MAC ID of receiving device For multicast message, this is a New P1905.1 Multicast MAC address for multicast messages |
| Media Type | 6 octets | | The Egress Media Type of the port on which the message is transmitted |
| Message Type | 1 octet | 0x00 or 0x01 if DA is set to the P1905.1 Multicast address 0x02~0x07 otherwise | 0x00: Advertisement Message 0x01: Global Command Message 0x02: Query Message 0x03: Query Response Message 0x04: Subscription Request Message 0x05: Subscription Confirm Message 0x06: Notification Message 0x07: Notification Confirm Message 0x08~0xFF: Reserved |
| Message Sub-Type | 1 octet | | 0x00: Topology 0x01: Security 0x02: Link Performance Metric 0x03~0xFF: Reserved |
| Transaction identifier | 4 octets | | Unique Identifier for a transaction; A response shall use the same transaction identifier as its corresponding request |
| Fragment Number | 1 octet | | Identifies the fragment number for a given Transaction identifier |
| Last Fragment Indicator | 1 bit | | '1': last fragment '0': not last fragment |
| Reserved field | 7 bits | All 0's | All values are reserved |
| P1905.1 Protocol TLVs | Variable length | | TLV(s) (see above) |
| End of Message TLV | 2 octets | | End of Message TLV (see Table 4) |

Table 5 includes an example end of message TLV as follows:

TABLE 5

| Field | Length | Value | Description |
| --- | --- | --- | --- |
| TLV type | 1 octet | 0x00 | End of Message TLV |
| TLV length | 1 octet | 0x00 | # octets in ensuing field |

At block 204 a first node receives the one or more discovery messages issued at block 202 and may use the information in the message to update a network topology maintained in the first node. In some embodiments, the Multicast Discovery Mechanism and message formats described above may allow for a P1905.1 compliant device to discover the existence of other P1905.1 compliant devices and legacy devices, to the extent possible, through the use of the topology discovery message and the legacy discovery message. The legacy discovery message, in combination with the topology discovery message, may be used to assist detection of the existence in the hybrid network topology of one or more legacy bridges between a transmitter and receiver of the message. A P1905.1 compliant device may infer that one of its interfaces has another P1905.1 compliant device as a neighbor without the intermediate presence of a conformant legacy bridge when it receives, on that interface, both a topology discovery message and a legacy discovery message transmitted by the same 1905.1 device. A P1905.1 compliant device may infer the presence of one or more legacy bridges between it and another P1905.1 compliant device when it receives only a topology discovery message transmitted by the other P1905.1 compliant device and not a legacy discovery message from that device on that interface. In the event that a legacy discovery message is dropped or damaged, a P1905.1 compliant device may make an incorrect inference that a legacy bridge is present between it and another P1905.1 compliant device when in fact a legacy bridge is not present. Transmission of both types of messages at periodic intervals may allow the P1905.1 compliant device to correct the improper inference of the presence of a legacy bridge because the receiving device may nevertheless subsequently receive another legacy discovery message and update its information to correct its topology information by removing the incorrectly inferred legacy bridge.

Blocks 206-210 describe a Topology Query/Response Procedure that may allow for a P1905.1 compliant device to query and retrieve topology information from another device through the use of a topology query message and a topology response message.

At block 206, in various embodiments, the first node issues a topology query message. A topology query message may be sent from one P1905.1 compliant device to another at any time. As described herein, the topology query message may be unicast. In some embodiments, no TLV need be included in the topology query message. The topology query message may include the sending device's P1905.1 device ID and a unique transaction ID for the query. If the querying device does not receive a topology response message containing the same transaction ID that was included in the topology query message, it may resend the topology query message.

At block 208, the first node receives one or more responses to the topology query message. In some embodiments, upon receiving a topology query message, a P1905.1 compliant device may respond with a topology response message. In some embodiments, the P1905.1 compliant device responds to a received topology query message with a topology response message. One topology response message may be sent per topology query message. A topology response message may be sent on any port, regardless of the port on which it was received. The topology response message may contain the same transaction ID that was received in the topology query message, the sending device's P1905.1 device ID, and for each of the receiving device's ports, the MAC address and media type/subtype of the port, and a list of neighboring legacy devices and neighboring P1905.1 compliant devices reachable via the port. The list of neighboring legacy devices may include, for each neighboring legacy device, the MAC address of the neighboring device's port, and the number of seconds since traffic of any kind from the neighboring legacy device was seen. The list of neighboring P1905.1 compliant devices may include, for each P1905.1 compliant neighboring device, the neighboring device's P1905.1 device ID, and the number of seconds since traffic of any kind from the neighboring P1905.1 device was seen. As described herein, the topology response message may be unicast. The following TLVs may be included in the topology response message: a device information type TLV, zero or one legacy neighbor list TLV, and zero or one P1905.1 neighbor list TLV. Table 6 includes an example P1905.1 compliant device information type TLV, Table 7 includes example media types, Table 8 includes an example legacy neighbor list TLV, and Table 9 includes an example neighbor TLV.

TABLE 6

| Field | Length | Value | Description |
| --- | --- | --- | --- |
| TLV type | 1 octet | 2 | Device Information Type |
| TLV Length | 1 octet | 15 + ... | # octets in ensuing field |
| TLV Value | 6 octets | | Interface-specific MAC ID of the local interface |
| | 1 octet | | Media Type of the local interface (see Table 2) |
| | 4 octets | | Network membership information of the local interface (see Table 2) |
| | 4 octets | | Reserved for Capability |
| | n octets | | If Capability indicates bridging include n MAC ID's where the MAC ID's are the MAC addresses of the interfaces that this bridge can reach Else n = 0 |

TABLE 7

| (First 4 bits of octet) | (Second 4 bits of octet) | Description | Media-Specific Information |
| --- | --- | --- | --- |
| 0 | 0 | IEEE 802.3u Fast Ethernet | N/A |
| | 1 | IEEE 802.3ab Gigabit Ethernet | N/A |
| | 2~15 | Reserved | Reserved |
| 1 | 0 | IEEE 802.11b (2.4GHz) | Network membership: |
| | 1 | IEEE 802.11g (2.4GHz) | 6 octets: BSSID Role: 2 bits: '00' |
| | 2 | IEEE 802.11a (5GHz) | AP, '01' SA, '10' and '11' are |
| | 3 | IEEE 802.11n (2.4GHz) | reserved |
| | 4 | IEEE 802.11n (5GHz) | |
| | 5 | IEEE 802.11ac (5GHz) | |
| | 6 | IEEE 802.11ad (60GHz) | |
| | 7~15 | Reserved | Reserved |
| 2 | 0 | IEEE 1901 Wavelet | Network membership: |
| | 1 | IEEE 1901 OFDM | AVLN |
| | 2 | HomePlug GreenPHY | TBD |
| | 3 | HomePlug AV 2.0 | TBD |
| | 4~15 | Reserved | Reserved |
| 3 | 0 | MoCA v1.1 | TBD |
| | 1 | MoCAv2.0 | TBD |
| | 2~15 | Reserved | Reserved |
| 4~15 | 0~15 | Reserved | Reserved |

TABLE 8

| Field | Length | Value | Description |
| --- | --- | --- | --- |
| TLV type | 1 octet | 3 | List of connected legacy neighbors |
| TLV Length | 1 octet | 6 + 8xn | # octets in ensuing field |
| TLV Value | 6 octets | | Interface-specific MAC ID of the local interface |

TABLE 8-continued

| Field | Length | Value | Description |
|---|---|---|---|
| | 6 octets | | Interface-specific MAC ID of legacy neighbor |
| | 2 octets | | Last time transmission was received from this neighbor in seconds |

TABLE 9

| Field | Length | Value | Description |
|---|---|---|---|
| TLV type | 1 octet | 4 | Information on Neighbor P1905.1 compliant Device |
| TLV Length | 1 octet | 10 + 6xn | # octets in ensuing field |
| TLV Value | 6 octets | | Interface-specific MAC ID of the local interface |
| | 6 octets | | P1905.1 MAC ID of P1905.1 compliant neighbor |
| | 2 octets | | Last time transmission was received from this neighbor in seconds |
| | 1 octet | | Existence of legacy bridge(s): 0: no legacy bridges exist 1: at least one legacy bridge exists between this device and the neighbor All other values are reserved |

In some embodiments, the topology query messages and the topology response messages issued and received at blocks 206 and 208 respectively may be topology subscription and topology notification messages. The topology subscription messages and topology notification messages may be in addition to, or instead of, the topology query and response messages described above. A Topology Subscription/Notification Procedure may allow a device to subscribe for topology changes at another P1905.1 compliant device. This may be accomplished through unicast messages, which may include: the topology subscription request message, the topology notification message, and the topology notification confirm message. A P1905.1 compliant device may be configured to support a minimum and maximum number of concurrent subscriptions.

In one embodiment, a topology subscription request message may be sent from one P1905.1 compliant device to another at any time. A topology subscription request message may contain a requested duration of the subscription. The subscription duration may be modified. For example, the receiving device may assign a duration that is shorter or longer than what was requested and indicate the modification in the topology notification message by including the modified subscription duration. If the subscriber device does not receive a topology notification message in response to a topology subscription request message, it may resend the topology subscription request message. A subscription may include a subscription ID, the sending device's P1905.1 device ID, and a requested subscription duration (e.g., in seconds). A new subscription ID may create a new subscription while specification of an existing subscription ID may modify an existing subscription. Further, a subscription may be established such that the requesting device is subscribed to topology changes at the target device. A subscriber device may modify the duration or cancel a subscription by sending a topology subscription request message with the subscription ID of the subscription for which modification or cancellation is desired and the modified subscription duration (e.g., zero representing zero seconds to cancel the subscription). A notification subscription request TLV may be included in the message. An example notification subscription request TLV is shown in Table 10.

TABLE 10

| Field | Length | Value | Description |
|---|---|---|---|
| TLV Type | 1 octet | 5 | Notification Subscription |
| TLV Length | 1 octet | 1 | # octets in ensuing field |
| TLV Value | 2 octets | | Subscription identifier |
| | 3 octet | | The requested duration (in seconds) of the subscription; a value of zero cancels a subscription |

In one embodiment, a P1905.1 compliant device receiving a topology subscription request message may respond by sending a topology notification message to a requesting device when a subscription is established or canceled, and, for the duration of the subscription, for changes in topology. The responding device may modify the requested subscription duration received in the topology subscription request message and include the modified subscription duration in the topology notification message. In some cases, a subscription request may not be accepted. Non-acceptance of a subscription request may be indicated by a value (e.g., zero) sent to the requesting device. A device may cancel or modify an existing subscription by sending a topology notification message with the subscription ID, with the subscription duration appropriately set, to the subscribing device. Cancellation of the subscription may be indicated by a value (e.g., zero representing a duration of zero) in the topology notification message. In some embodiments, a device may send a topology notification message to a subscribing device when a change in topology is detected, which may be indicated by a change in any information that is sent in a topology response message. If the device does not receive a topology notification confirm message in response to a topology notification message, it may resend the message up to a certain number of times. There is no requirement to wait for some period of time after receiving a cancellation before resubscribing. Renewal of a subscription may be performed by sending a subscription request with the same subscription ID. After expiration or cancellation, the requesting device may request a new subscription with a new subscription ID.

The topology notification message may include the duration of the subscription and the device's current topology state. It may also include the sending device's P1905.1 device ID, the subscription ID of the subscription, the remaining duration, and for each of the device's ports, the MAC address and media type/subtype of the port, and a list of neighboring legacy devices and neighboring P1905.1 compliant devices reachable via the port. The list of neighboring legacy devices may include, for each neighboring legacy device, the MAC address of the neighboring legacy device's port, and the number of seconds since traffic of any kind from the neighboring legacy device was seen. The list of neighboring P 1905.1 compliant devices may include the neighboring device's P 1905.1 device ID, and the number of seconds since traffic of any kind from the neighboring P1905.1 compliant device was seen. The topology notification message may contain the current state of the information. In various embodiments, the following TLVs may be included with the message: one device information type TLV, zero or one legacy neighbor list TLV, and zero or one P1905.1 neighbor TLV.

In some embodiments, a P1905.1 compliant device may respond to a received topology notification message with a topology notification confirm message. Upon receiving the notification, the requesting device may store the duration so that it may renew the subscription before expiration. The topology notification confirm message may include the same transaction ID as received in the topology notification message. In one embodiment, no TLVs need be included in the topology notification confirm message.

At block 210, the first node may issue topology query messages or topology subscription request messages to neighboring nodes identified in the response messages received at block 208. The first node can repeat the topology query process to a desired depth in the network, or until no new devices are discovered.

Some or all of the messages above may be throttled or bundled in order to avoid undesirable flooding of a hybrid network with topology discovery protocol messages. For example, in some embodiments, messages may be throttled to a predetermined or configurable message rate. As an example, a network device may be configured to send no more than one message every five seconds. Additionally, a network device may be configured to delay issuing topology discovery messages until a predetermined or configurable amount of time after power up. The delay may be determined differently on different devices so that not all devices transmit discovery requests simultaneously when powered up at or near the same time.

Further, a network device may be configured to bundle notification messages so that not every topology change is immediately reported. For example, a network device may be configured to bundle twenty topology changes in a notification message. In other words, a node may be configured to not report any detected topology change until twenty changes have been detected. In some embodiments, bundling may be combined with a timer. For example, a node may be configured to not report any detected topology changes until twenty changes are detected or until ten seconds have elapsed after the last reported change, whichever comes first.

Figure 3:
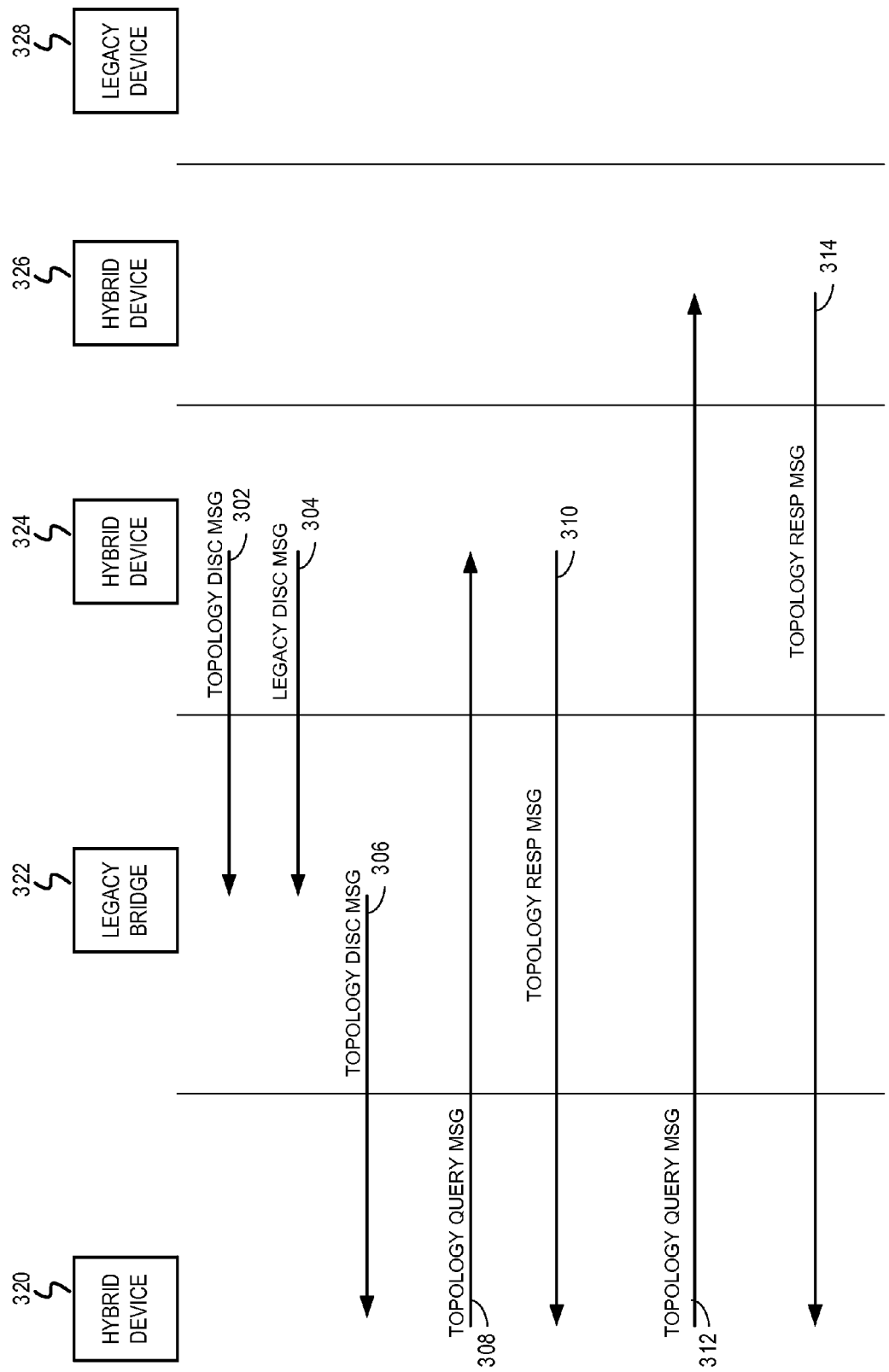
FIG. 3 illustrates an example sequence diagram for determining a topology in a hybrid network.

FIG. 3 is a sequence diagram illustrating an example sequence of messages that may be exchanged between a subset of devices in a hybrid communications network during a portion of a topology discover procedure. For the purposes of the example, assume that a hybrid communications network includes hybrid device 320, hybrid device 324, legacy bridge 322 between hybrid device 320 and hybrid device 324, hybrid device 326 and legacy device 328. Further assume that hybrid device 324 and hybrid device 326 are neighbor devices and that legacy device 328 is a neighbor of hybrid device 326.

At some point in time, hybrid device 324 determines that topology discovery messages are to be sent. As noted above, the determination may be due to a power up event, a topology change event, or a timer expiration event. At sequence step 302, hybrid device 324 may send a topology discovery message to a P1905.1 multicast address. In some embodiments, hybrid device 324 may also send a legacy discovery message (sequence step 304) at approximately the same time as the topology discovery message. The topology discovery message and the legacy discovery message include data identifying hybrid device 324 and announce the presence of hybrid device 324 on the hybrid network. In some embodiments, either or both the legacy discovery message and the topology discovery message do not identify any other nodes (e.g., neighbor nodes) other than the sending node (hybrid device 324 in this example).

Legacy bridge 322 receives the topology discover message and legacy discovery message. Other devices in the hybrid network may also receive the messages as the messages may be multicast messages. However, to avoid obfuscating the example, only interaction between legacy bridge 322 and hybrid device 324 is illustrated in FIG. 3 with respect to the multicast discovery messages issued by hybrid device 324.

Legacy bridge 322, in compliance with legacy communications protocols, may be configured to decline to forward legacy discovery messages. As a result, at sequence step 306, the topology discovery message is forwarded to hybrid device 320, while the legacy discovery message is not forwarded.

Upon receipt and processing of the topology discovery message, hybrid device 320 may learn that hybrid device 324 is part of the network topology. In addition, because hybrid device 320 received a topology discovery message and did not receive a legacy discovery message, hybrid device 320 may infer that a legacy bridge (e.g., legacy bridge 322) exists between hybrid device 320 and hybrid device 324 and can add that information to its view of the network topology. It should be noted that had legacy bridge 322 been a hybrid bridge, in some embodiments both the topology discovery message and the legacy discovery message would have been forwarded by the hybrid bridge. In this case, hybrid device 320 may infer the existence of a hybrid bridge between hybrid device 320 and hybrid device 324 rather than a legacy bridge.

For the purposes of this example, assume that hybrid device 320 is configured to maintain more information about the network topology than is available from topology discovery messages or legacy discovery messages. At sequence step 308, hybrid device 320 sends a topology query message to hybrid device 324. In response to receiving the topology query message, at sequence step 310 hybrid device 324 sends a topology response message to hybrid device 320. The topology response message includes a list network nodes that are neighbors of hybrid device 324 and information about the neighboring network nodes (e.g., information identifying the neighboring nodes and the type of neighboring nodes). In this example, hybrid device 326 is included in the list of neighboring nodes.

Hybrid device 320 receives the response and, in this example, determines that hybrid device 326 is part of the network topology. At sequence step 312, hybrid device 320 sends a topology query message to hybrid device 326. In response, at sequence step 314, hybrid device 326 sends a topology response message to hybrid device 320. The topology response message may include a list network nodes that are neighbors of hybrid device 326 and information about the neighboring nodes. In this example, the list may include hybrid device 324 and legacy device 328. Hybrid device 320 receives the response and may use the information in the response to add to its view of the network topology. In this example, hybrid device 320 already knows about hybrid device 324 and may add information about legacy device 328 to its view of the hybrid network topology.

Those of skill in the art having the benefit of the disclosure will appreciate that the example message sequence illustrated in FIG. 3 is but one example of many message sequences that could take place in a hybrid network, that that other sequences using the above-described messages and methods are possible and within the scope of the inventive subject matter.

In some embodiments, the two stage topology discovery protocol described above may be a stateless protocol. The multicast topology discovery message and legacy discovery message announce that a potential change has occurred in a hybrid network topology without detailing changes in the hybrid network topology and thus do not require participating nodes to maintain a communications state. Only those nodes that are interested in obtaining further information about the hybrid network topology need use topology query messages as described above to obtain a current topology for the hybrid network.

Figure 4:
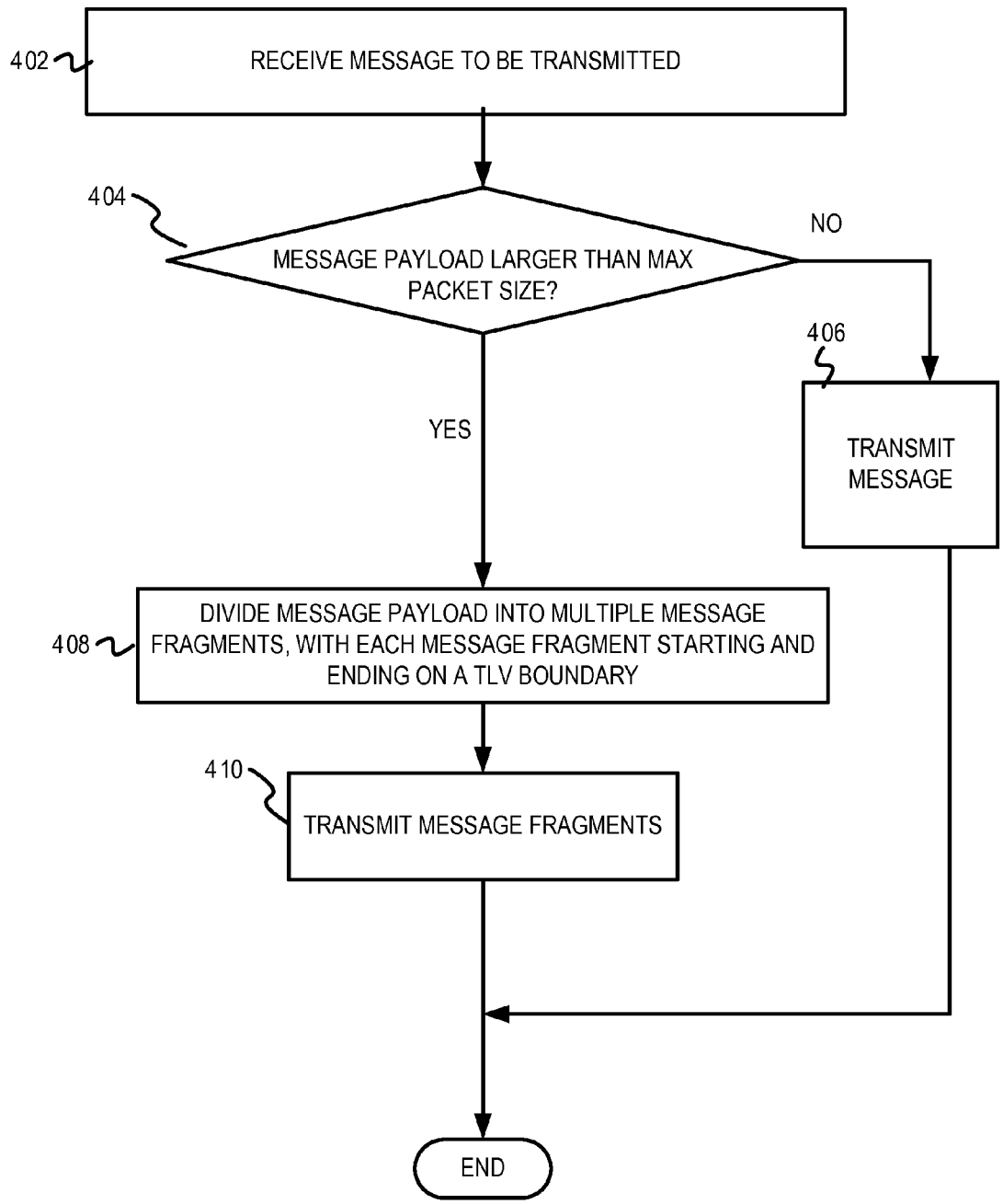
FIG. 4 illustrates example operations for fragmenting messages that exceed a maximum payload size.

FIG. 4 illustrates example operations in a method 400 for fragmenting messages that exceed a maximum payload size. The method begins at block 402 by receiving a message (e.g., one of the messages described above). At block 404, the device determines if the message size exceeds a maximum payload size. If the message size does not exceed the maximum payload size, then at block 406 the message is transmitted. Otherwise In various embodiments, when a P1905.1 compliant device attempts to form a message that exceeds the payload of the Ethernet frame, then at block 408 the device may fragment the message. Fragmenting may include breaking down the message into multiple fragments at TLV boundaries. The transmitting device may sequentially generate a sequence of fragments where each fragment may contain a number of TLVs such that the message may fit the payload of the Ethernet frame. For each generated message with the same sequence number, the transmitting device may assign a unique fragment number to it, starting from 0 (e.g., 0, 1, 2, 3). The transmitting device may set a last fragment indicator field to '1' in the last fragment. A TLV may be too large to fit in a single message. For example, a neighbor list TLV may have a sufficient number of individual neighbor TLVs such that the neighbor list TLV exceeds a maximum message size. In some embodiments, a TLV that is too large to fit into a single message may be divided into multiple TLVs of the same type. For example, assume that a neighbor list having fifty neighbor TLVs is too large to transmit as a single message. The single neighbor list TLV may be divided into multiple neighbor list TLVs, each containing a subset of the original list of neighbor TLVs. The multiple smaller neighbor list TLVs may then be transmitted in separate messages.

In some embodiments, if the receiving device receives a message fragment, the receiving device may attempt to reassemble the message. The receiving device may deliver the reassembled message for further processing if all of the fragments have been received. An indication that all fragments have been received may include receiving a fragment with a last fragment indicator. In one embodiment, a receiving device may wait for a time out before discarding received fragments that cannot be reassembled completely to avoid waiting for lost fragments indefinitely.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LP-DDR2, etc.) SDRAM, Rambus DRAM (RDRAM), static RAM (SRAM), etc.), ROM, erasable programmable memory (e.g., EPROM and EEPROM); Flash memory, non-volatile memory (e.g. Flash memory) accessible via a peripheral interface such as the Universal Serial Bus (USB) interface, etc. Storage media may include microelectromechanical systems (MEMS) or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider)

Figure 5:
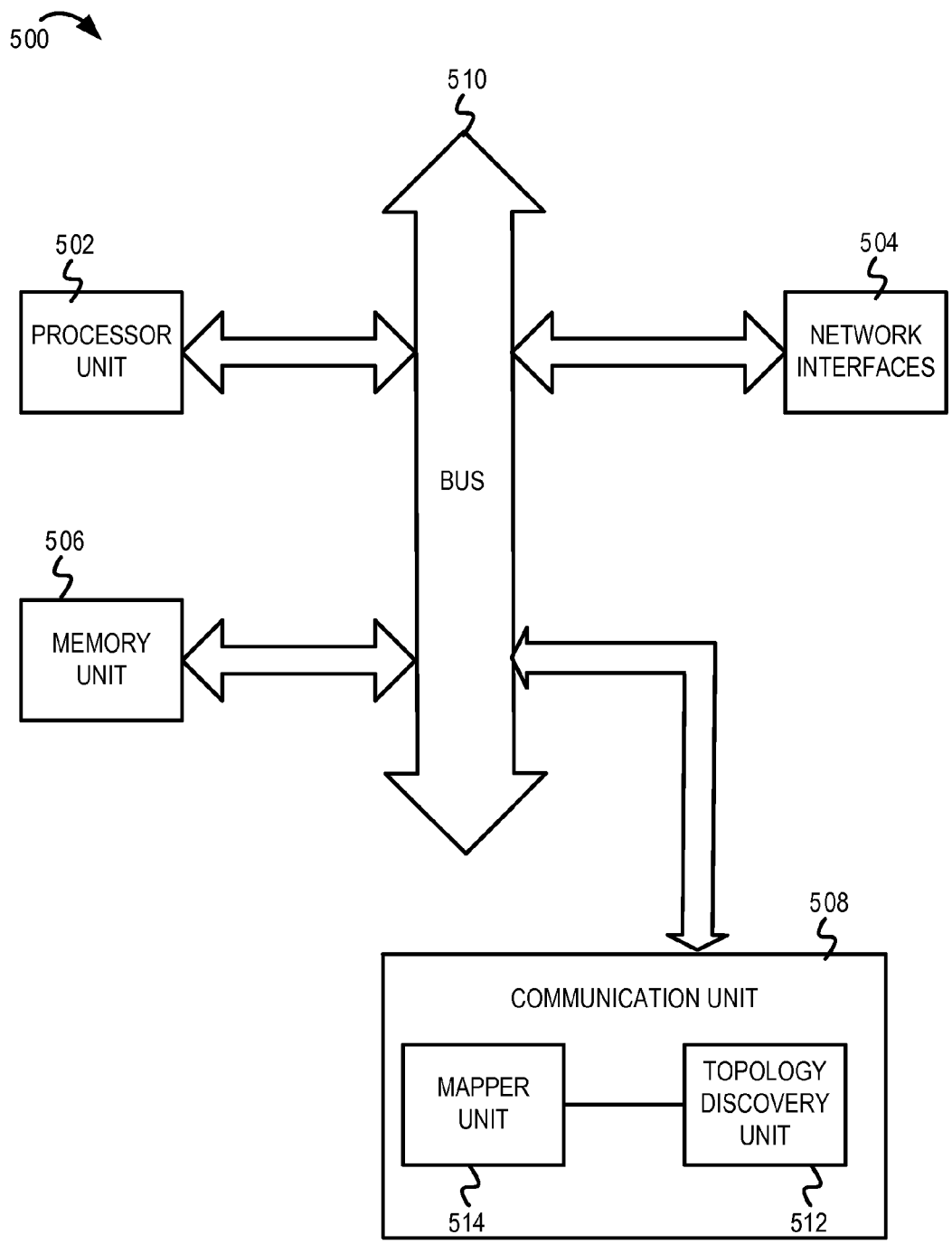
FIG. 5 is an example block diagram of one embodiment of an electronic device including a mechanism for discovery of legacy network devices, hybrid network devices and bridges in a hybrid communications network.

FIG. 5 is a block diagram of one embodiment of an electronic device 500 including a mechanism for determining a network topology in a hybrid communications network. In some implementations, the electronic device 500 may be one of a laptop computer, a netbook, a mobile phone, a powerline communication device, a personal digital assistant (PDA), or other electronic systems comprising a hybrid communication unit configured to exchange communications across multiple communication networks (which form the hybrid communications network). The electronic device 500 includes a processor unit 502 (possibly including multiple processors, multiple cores, multiple nodes, and/or implementing multithreading, etc.). The electronic device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, InfiniBand®, NuBus, AHB, AXI, etc.), and network interfaces 504 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, a powerline communication interface, etc.). In some implementations, the electronic device 500 may support multiple network interfaces—each of which is configured to couple the electronic device 500 to a different communication network.

The electronic device 500 also includes a communication unit 508. The communication unit 508 comprises a topology discovery unit 512 and a mapper unit 514. As described above in FIGS. 1-3, the communication unit 508 implements functionality to determine a topology for a hybrid communication network (e.g., a CDHN). Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, and the network interfaces 504 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, a mechanism for determining a network topology in a hybrid communications network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:
 receiving one or more discovery messages at a first node, the one or more discovery messages identifying a neighbor node to the first node;
 determining that a first type of bridge is between the first node and the neighbor node based, at least in part, on determining that the one or more discovery messages include a first discovery message for a first discovery protocol and a second discovery message for a second discovery protocol;
 determining that a second type of bridge is between the first node and the neighbor node based, at least in part, on determining that the one or more discovery messages include the first discovery message for the first discovery protocol and do not include the second discovery message for the second discovery protocol; and
 determining a network topology based, at least in part, on the one or more discovery messages and one of the first type of bridge or the second type of bridge.

2. The method of claim 1, further comprising transmitting a topology subscription message, wherein the topology subscription message includes a requested duration for a topology subscription, and wherein in response to the topology subscription message, a receiving node transmits a topology notification message upon detecting a network topology change.

3. The method of claim 2, further comprising:
 modifying, by the receiving node, the requested duration to create a modified requested duration; and
 transmitting, by the receiving node, a response to the topology subscription message, the response including the modified requested duration.

4. The method of claim 3, further comprising terminating the topology subscription based on setting the modified requested duration to a value indicating subscription termination.

5. The method of claim 1, wherein a message includes TLV (type, length and value) portions, further comprising:
 determining that the message exceeds a maximum transmission unit size; and
 in response to determining that the message exceeds the maximum transmission unit size, fragmenting the message into multiple transmission units, wherein the fragmenting occurs on a TLV portion boundary;
 wherein the message comprises at least one member of a group consisting of a discovery message, a topology query message, a topology subscription message, and a topology notification message.

6. The method of claim 1, further comprising throttling one of topology discovery messages and topology response messages to a predetermined rate or a configurable rate.

7. The method of claim 1, further comprising bundling, into a message, either or both topology discovery messages and topology response messages in one of a predetermined message quantity or a configurable message quantity.

8. A method comprising:
 transmitting, by a first node, a first discovery message for a first discovery protocol and a second discovery message for a second discovery protocol, the first discovery message and the second discovery message identifying the first node to a neighboring node;
 receiving, by the first node from a second node, a topology query message; and
 transmitting, by the first node, a response message to the topology query message, wherein the response message includes data identifying zero or more neighboring nodes to the first node;
 wherein the second node determines that a first type of bridge is between the first node and the second node in response to receiving the first discovery message and the second discovery message, wherein the second node determines that a second type of bridge is between the first node and the second node in response to receiving the first discovery message and not receiving the second discovery message, and wherein the second node determines a network topology based, at least in part, on the response message and one of the first type of bridge and the second type of bridge.

9. The method of claim 8, wherein the first discovery message and the second discovery message are transmitted in response to at least one member of a group consisting of a power up of the first node, an expiration of a timer on the first node, and detection of a topology change by the first node.

10. The method of claim 8, wherein the first node delays, after power up of the first node, transmission of the first discovery message and the second discovery message for a predetermined time or a configurable time period.

11. A network device comprising:
 a processor;

a non-transitory machine-readable storage medium having stored thereon machine executable instructions that, when executed by the processor, cause the network device to:
- receive one or more discovery messages, the one or more discovery messages identifying a neighbor node to the network device;
- determine that a first type of bridge is between the network device and the neighbor node based, at least in part, on a determination that the one or more discovery messages include a first discovery message for a first discovery protocol and a second discovery message for a second discovery protocol;
- determine that a second type of bridge is between the network device and the neighbor node based, at least in part, on a determination that the one or more discovery messages include the first discovery message for the first discovery protocol and do not include the second discovery message for the second discovery protocol; and
- determine a network topology based, at least in part, on the one or more discovery messages and one of the first type of bridge or the second type of bridge.

12. The network device of claim 11, wherein the machine executable instructions further cause the network device to transmit a topology subscription message, wherein the topology subscription message includes a requested duration for a topology subscription, and wherein in response to the topology subscription message, a receiving node transmits a topology notification message upon detecting a network topology change.

13. The network device of claim 12, wherein a response message to the topology subscription message includes a modified requested duration.

14. The network device of claim 12, wherein the machine executable instructions further cause the network device to terminate the topology subscription based on setting the requested duration to a value indicating subscription termination.

15. The network device of claim 11, wherein a message includes TLV (type, length and value) portions, and wherein the machine executable instructions further cause the network device to:
- determine that the message exceeds a maximum transmission unit size; and
- in response to determining that the message exceeds the maximum transmission unit size, fragment the message into multiple transmission units, wherein the message is fragmented on a TLV portion boundary;
- wherein the message comprises at least one member of a group consisting of a discovery message, a topology query message, a topology subscription message, and a topology notification message.

16. The network device of claim 11, wherein the machine executable instructions further cause the network device to throttle one of topology discovery messages and topology response messages to one of a predetermined rate or a configurable rate.

17. The network device of claim 11, wherein the machine executable instructions further cause the network device to bundle one of topology discovery messages and topology response messages in one of a predetermined message quantity or a configurable message quantity.

18. A non-transitory machine-readable storage medium having instructions stored therein, which when executed by a processor of a network device cause the network device to perform operations comprising:
- receiving, by a first node, one or more discovery messages, the one or more discovery messages identifying a neighbor node to the first node;
- determining that a first type of bridge is between the first node and the neighbor node based, at least in part, on determining that the one or more discovery messages include a first discovery message for a first discovery protocol and a second discovery message for a second discovery protocol;
- determining that a second type of bridge is between the first node and the neighbor node based, at least in part, on determining that the one or more discovery messages include the first discovery message for the first discovery protocol and do not include the second discovery message for the second discovery protocol; and
- determining a network topology based, at least in part, on the one or more discovery messages and one of the first type of bridge or the second type of bridge.

19. The non-transitory machine-readable storage medium of claim 18, wherein the operations further comprise transmitting a topology subscription message, wherein the topology subscription message includes a requested duration for a topology subscription, and wherein in response to the topology subscription message, a receiving node issues a topology notification message upon detecting a network topology change.

20. The non-transitory machine-readable storage medium of claim 19, wherein the operations further comprise:
- modifying the requested duration to create a modified requested duration; and
- transmitting a response to the topology subscription message, the response including the modified requested duration.

21. The non-transitory machine-readable storage medium of claim 20, wherein the operations further comprise terminating the topology subscription based on setting the modified requested duration to a value indicating subscription termination.

22. The non-transitory machine-readable storage medium of claim 18, wherein a message includes TLV (type, length and value) portions, and wherein the operations further comprise:
- determining that the message exceeds a maximum transmission unit size; and
- in response to determining that the message exceeds the maximum transmission unit size, fragmenting the message into multiple transmission units, wherein the fragmenting occurs on a TLV portion boundary.

23. The non-transitory machine-readable storage medium of claim 18, wherein the operations further comprise throttling one of topology discovery messages and topology response messages to one of a predetermined rate or a configurable rate.

24. The non-transitory machine-readable storage medium of claim 18, wherein the operations further comprise bundling, into a message, either or both topology discovery messages and topology response messages in one of a predetermined message quantity or a configurable message quantity.

* * * * *